United States Patent [19]
Vestermark

[11] Patent Number: 4,532,769
[45] Date of Patent: Aug. 6, 1985

[54] ENERGY STORING FLYWHEEL ASSEMBLY

[76] Inventor: Lyle A. Vestermark, 714 Pacific Ave., #1108, Long Beach, Calif. 90813

[21] Appl. No.: 646,962

[22] Filed: Sep. 4, 1984

[51] Int. Cl.³ .................................................. B60K 9/04
[52] U.S. Cl. ..................................... 60/698; 180/54.1; 180/165
[58] Field of Search .................... 60/698; 180/54.1, 165

[56] References Cited

U.S. PATENT DOCUMENTS

| | | | |
|---|---|---|---|
| 3,493,066 | 2/1970 | Dooley | 180/165 |
| 3,497,026 | 2/1970 | Calvert | 180/165 |
| 4,131,171 | 12/1978 | Keyes | 180/54.1 |
| 4,218,624 | 8/1980 | Schiavone | 180/165 |

Primary Examiner—Allen M. Ostrager
Attorney, Agent, or Firm—William C. Babcock

[57] ABSTRACT

An energy storing flywheel assembly in which first and second reels are operatively connected by a flexible band, with the first and second reels capable of being rotated by first and second electric motors, and the second reel that can rotate either clockwise or counter clockwise through a clutch mechanism driving a flywheel. The flywheel that stores rotational energy is free to rotate independently of the second reel in a clockwise direction except when it is eccelerated to a predetermined maximum rate by the second reel. Acceleration of the flywheel occurs as the first motor drives the first reel at a constant rate to wind the band thereon. After the flywheel has reached the desired maximum rate of rotation the second reel is rotated to rewind the band thereon. Upon the rate of rotation of the flywheel decreasing to a predetermined minimum the above described operation is repeated.

7 Claims, 10 Drawing Figures

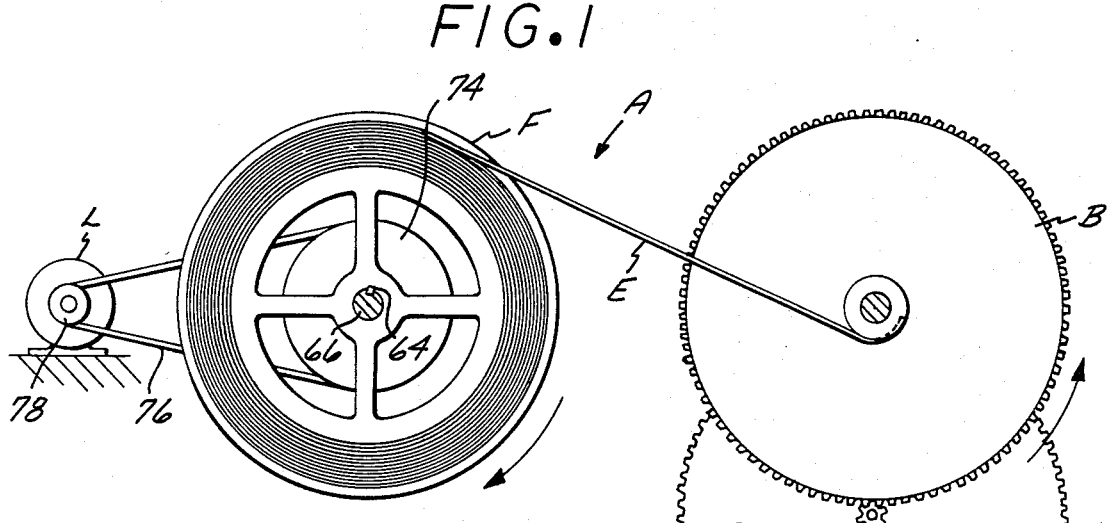
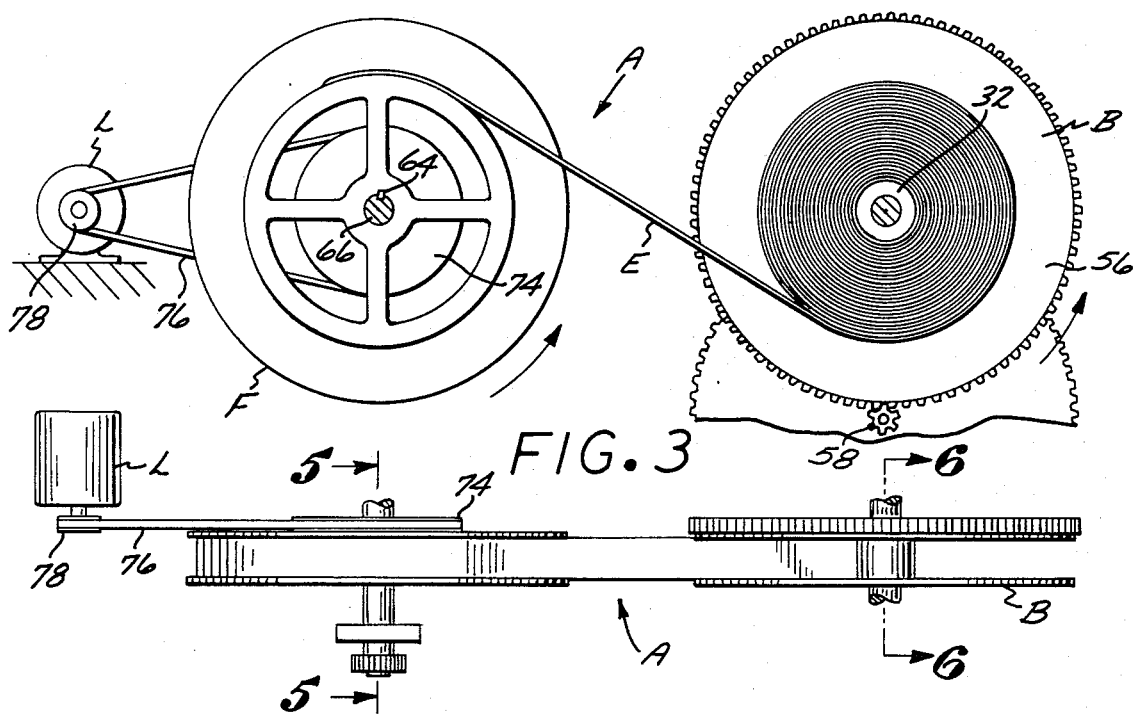
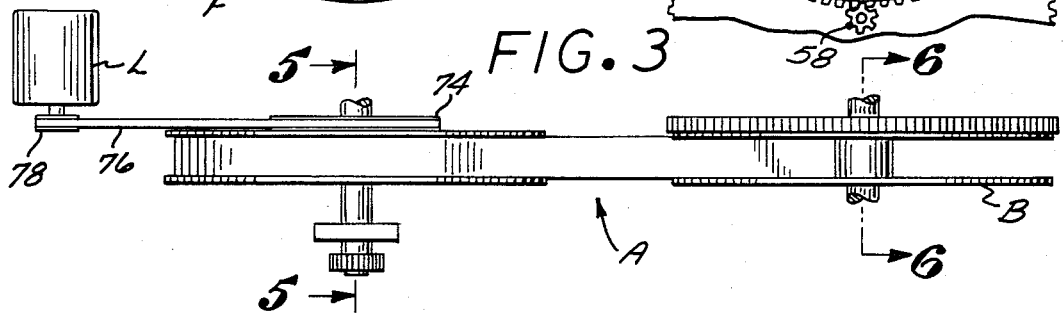
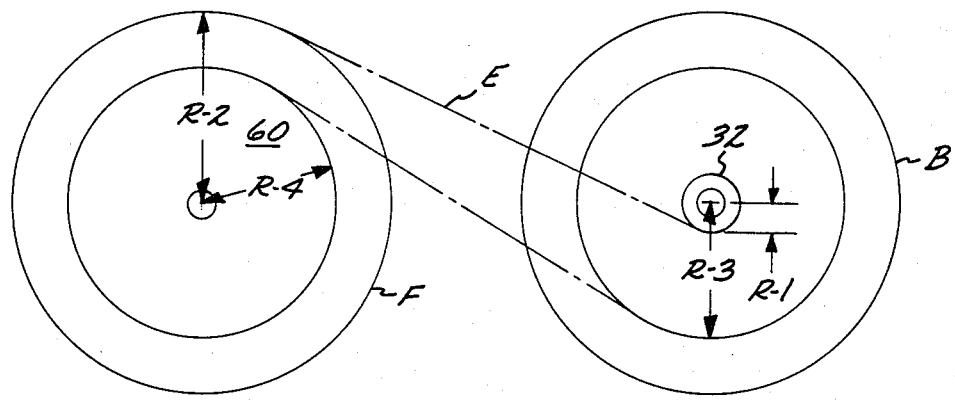

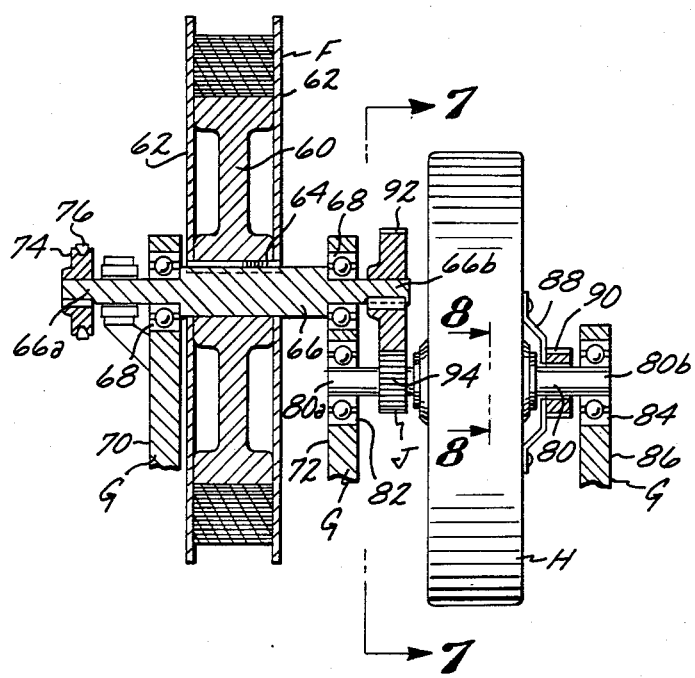
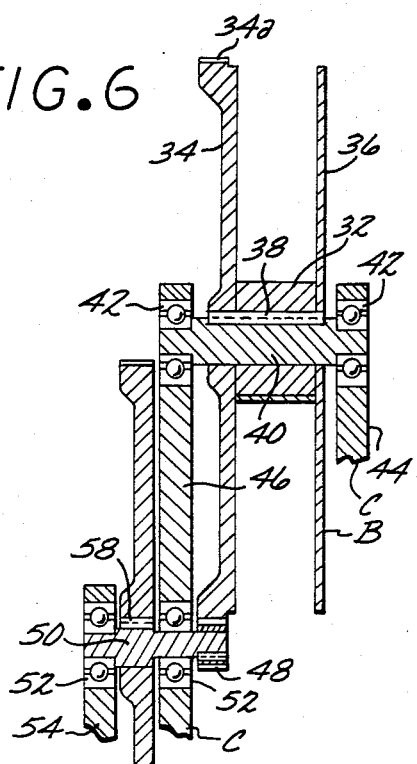
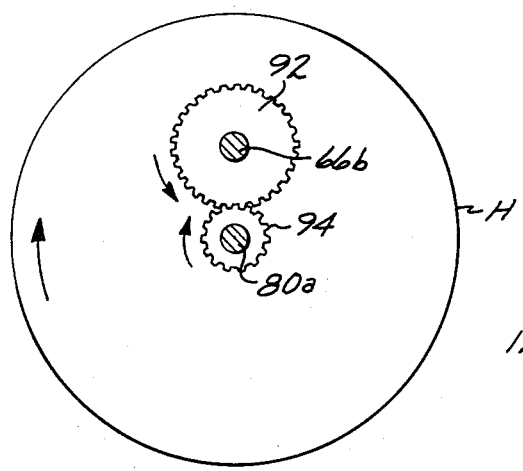
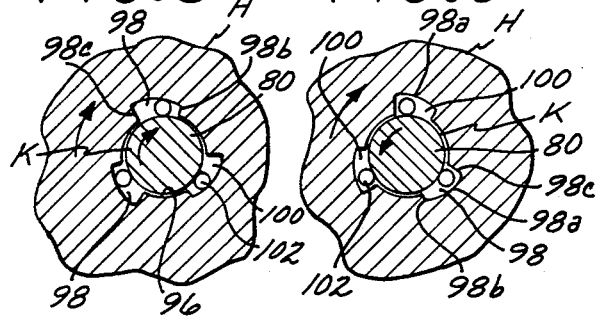
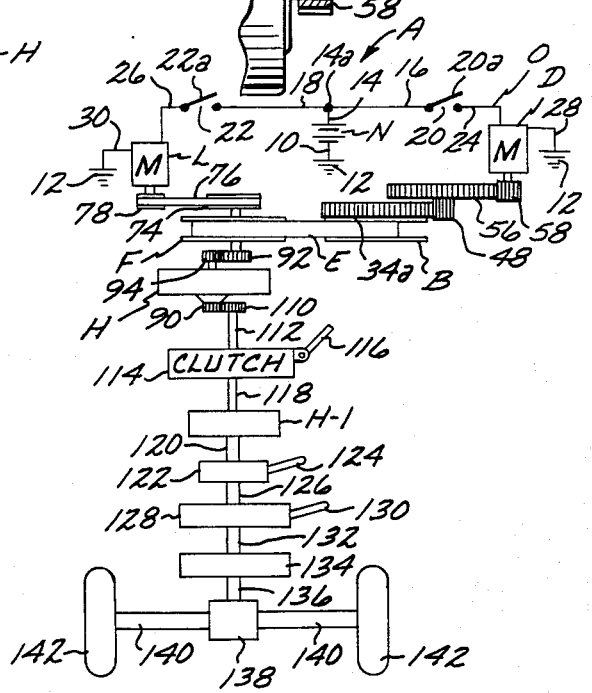

ENERGY STORING FLYWHEEL ASSEMBLY

DESCRIPTION OF THE PRIOR ART

For many years it has been known that a heavy flywheel is an effecient mechanism for storing rotational energy. However, flywheels have been used to but a limited extent for this purpose, due to the necessity of having heavy and powerful prime movers to accelerate them to a high rate of rotation. Instead, the use of flywheels has been limited primarily to smoothing out variations in the rate of rotation of power imparted to a rotating member, such as the drive shaft of an automotive vehicle.

A major object of the present invention is to provide an energy storing flywheel assembly in which the flywheel can be accelerated to a desired predetermined maximum rate of rotation by an inexpensive, low horse power electric motor.

Another object of the invention is to furnish an energy storing flywheel assembly in which first and second rotatably supported reels are operatively connected by a flexible band, with the first reel when rotated at a constant speed unwinding the band from the second reel at an accelerated rate until the desired maximum rate of rotation of the flywheel is achieved after which a second electric motor rotates the second reel to rewind the band thereon so that the operation may be repeated when the rate of rotation of the flywheel decreases to a predetermined minimum.

These and other objects of the invention, including the use thereof in an automotive vehicle, will become apparent from the following description thereof.

SUMMARY OF THE INVENTION

An energy storing flywheel assembly in which first and second rotatably supported reels have a flexible band extending therebetween, with the first reel capable of being driven at a constant rate, and the second reel by a clutch mechanism being connected to a flywheel of substantial weight. The second reel can rotate in either a clockwise of counter clockwise direction. The rate of rotation of the flywheel in a clockwise direction is independent of that of the second reel except when the flywheel is being accelerated to a desired maximum rate of rotation by the second reel.

The major portion of the band is initially wound on the second reel. Acceleration of the flywheel is achieved by causing the first motor to drive the first reel, with the band being unwound from the second onto the first reel. As the radius of the band on the first reel increases and the radius of the band on the second reel decreases, the rate of rotation of the flywheel is increased until a desired maxium rate of rotation is achieved.

After the flywheel is rotating as a maximum rate, the second motor is employed to rotate the second reel in a direction to rewind the band thereon. After the flywheel decreased to a predetermined rate of rotation, the first motor is employed to rotate the first reel to repeat the above described operation and return the flywheel to the maximum rate of rotation.

BRIEF DESCRIPTION OF THE DRAWINGS

FIG. 1 is a side elevational view of the flywheel and first and second band supporting reels, with the major portion of the band wound on the second reel;

FIG. 2 is the same view as shown in FIG. 1, with the major portion of the band having been transferred to the first reel as occurs when the flywheel is accelerated to a maximum rate of rotation;

FIG. 3 is a top plan view of the invention shown in FIG. 1;

FIG. 4 is a diagrammatic view of the invention;

FIG. 5 is a transverse cross sectional view of the invention taken on the line 5—5 of FIG. 3;

FIG. 6 is a transverse cross sectional view of the invention taken on the line 6—6 of FIG. 3;

FIG. 7 is transverse side elevational view of the invention taken on the line 7—7 of FIG. 5;

FIG. 8 is a fragmentary transverse cross sectional view of the invention taken on the line 8—8 of FIG. 5;

FIG. 9 is the same view as FIG. 8 but with the locking members in a different position; and FIG. 10 is a diagrammatic view of a rear portion of an automotive vehicle that is powered by the invention.

DESCRIPTION OF THE PREFERRED EMODIMENT

The energy storing flywheel assembly A of the present invention includes a first reel B that is rotatably supported on a first frame C and may be driven by a first electric motor D. The first reel B has a portion of an elongate steel ribbon E wound in the form of a spiral thereon.

A second reel F is aligned with the first reel B as may be seen in FIG. 3 and has a portion of the steel ribbon E wound thereon. The second reel F is rotatably supported by a second frame G. In FIG. 5 it will be seen that the second frame G also rotatably supports a heavy flywheel H. The second reel F by gears J is capable of imparting rotating motion to the flywheel H. The flywheel H due to a clutch K shown in FIGS. 8 and 9 is free to rotate independently of second reel F. A second electric motor L is provided to rotate the second reel F for reasons that will later be explained. The first and second motors D and L may be individually electrically energized from a source of electric power N such as a storage battery by the circuit O shown in FIG. 10.

The circuit O includes an electrical conductor 10 that extends from one terminal of source of electric power N to ground 12 with the other terminal having an electrical conductor 14 extending therefrom to a junction point 14a. Electrical conductors 16 and 18 extend from junction point 14a to first and second electrical switches 20 and 22 that have blades 20a and 22a. The blades 20a and 22a are connected by electrical conductors 24 and 26 to fist terminals of first and second electric motors D and L, with second terminals of the motors being connected by electrical conductors 28 and 30 to ground 12.

The first reel B as may be seen in FIG. 6 includes a first hub 32 that has first and second circular side plates 34 and 36 secured thereto, with the hub by a key 38 secured to a first reel supporting shaft 40 that is journalled in a pair of bearings 42 that are mounted in supports 44 and 46 that form a part of first frame C. The frame C is secured to a suitable base structure (not shown).

The first side plate 34 has teeth 34a defined on the periphery thereof that engage a first gear 48 of small diameter that is secured to an end portion of a shaft 50 that is rotatably supported by a second pair of bearings 52. The pair of second bearings 52 are axially aligned and mounted in second support 46 and a third support 54 that form a part of frame C. A second gear 56 of

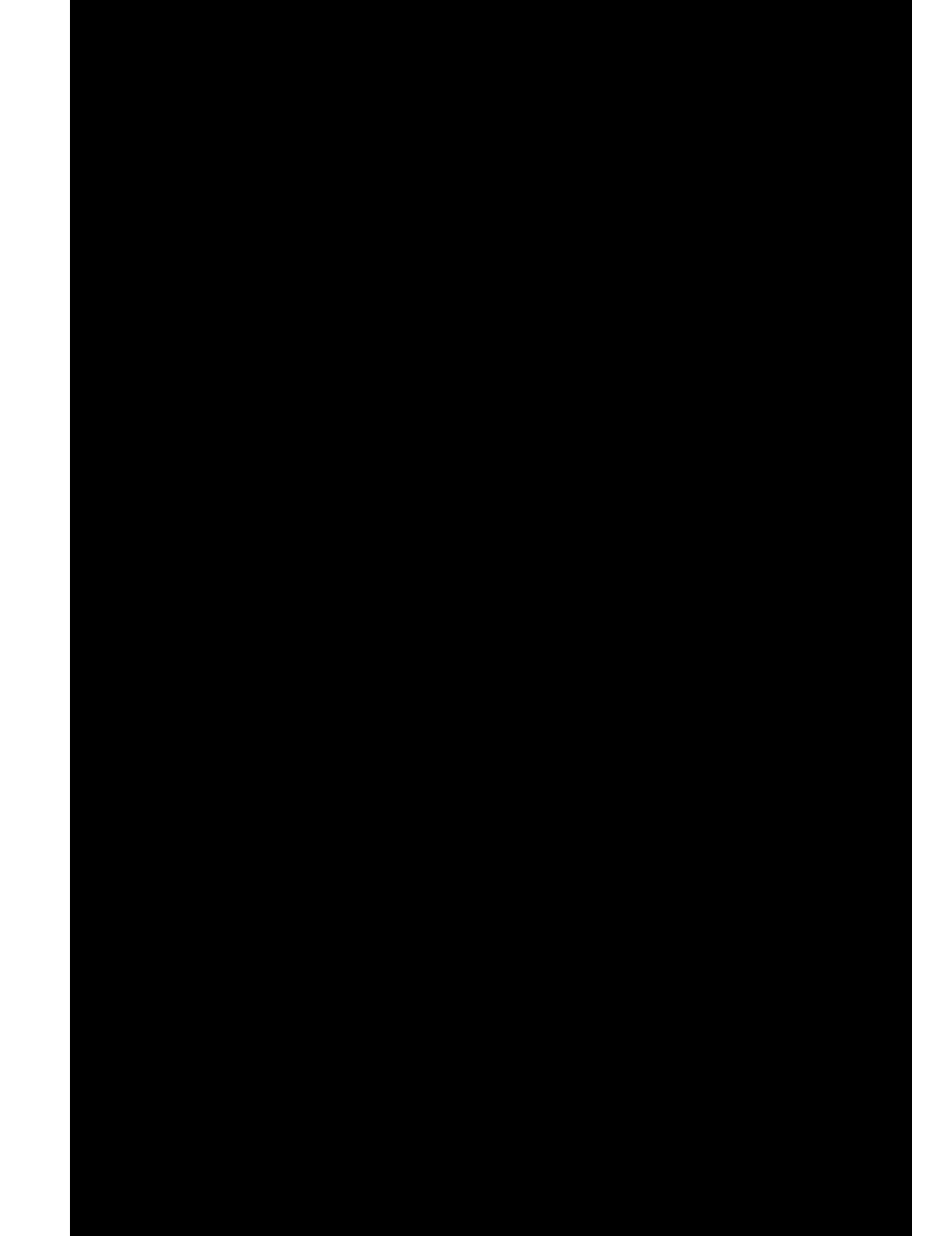

to a second standard shaft clutch 122 that is actuated by a movable member 124. A second power transmitting shaft 126 extends from second clutch 122 to a multiple speed first transmission 128 that is actuated by a movable control member 130. A third power transmitting shaft 132 extends from first transmission 128 to a second conventional transmission 134 with continuously variable speed ratios that drives a fourth power transmitting shaft 136. Fourth power transmitting shaft 136 is connected to a conventional differential 138 from which oppositely extending shaft 140 project to drive a pair of pneumatic tired wheels 142 of the vehicle (not shown).

In operation the first fly wheel H is brought up to maximum speed as previously explained with the first clutch 114 in a non power transmitting position. After first fly wheel H is brought to maximum speed the first clutch 114 is placed in a power transmitting position and second fly wheel H-1 caused to rotate.

Rotational power will be transferred from first fly wheel H to second fly wheel H-1. As such rotational power is transmitted first fly wheel H will slow down and the rate of rotation of second fly wheel H-1 will increase. When both first and second fly wheels H and H-1 are rotating at substantially the same rate first clutch 114 is returned to a non-power transmitting condition.

First fly wheel H is now free of any load and may again be accelerated to maximum speed as previously explained.

After the second fly wheel H-1 has been accelerated to the same speed as first fly wheel H, the second clutch 122 which has been in a non-power transmitting condition is placed in a power transmitting condition for shaft 126 to drive first transmission 128 which delivers rotational power to shaft 132. The second transmission 134 through shaft 136 delivers power to differential 138 to drive the pair of wheels 142.

As power is delivered to the pair of wheels 142 the rate of rotation of second fly wheel H-1 will slow down. During this slowing down the first fly wheel H has been accelerated to maximum speed by the assembly A as previously described.

When the rate of rotation of second fly wheel H-1 has decreased to a predetermined minimum first clutch 114 is placed in a power transmitting condition for first fly wheel H to accelerate second fly wheel H-1, with both fly wheels H and H-1 now supplying power to the wheels 142.

When both fly wheels H and H-1 are rotating at substantially the same speed, first clutch 114 is placed in a non-power transmitting condition and first fly wheel H again accelerated to maximum speed. During this period of acceleration second fly wheel H-1 will be supplying power to drive wheels 142. When the second fly wheel H-1 decreases to a predetermined minimum speed it is again accelerated by first fly wheel H as previously explained.

The use and operation of the invention has been explained previously in detail and need not be repeated.

What is claimed is:

1. An energy producing fly wheel assembly that includes:
    a. first and second laterally spaced, transversely aligned, rotatably supported first and second reels that have first and second hubs, said second hub of substantially greater diameter than said first hub;
    b. an elongate coilable ribbon that extends between said first and second hubs and is secured thereto with said ribbon initially having the major portion thereof coiled on said second hub;
    c. a first rotatably supported shaft;
    d. a first fly wheel rotatably supported on said first shaft;
    e. first means for rotating said first fly wheel with said first shaft only when said first shaft rotates in a first direction;
    f. a first clutch that includes a power input and power output shaft and first movable clutch control means that can occupy either first or second positions, said first clutch transmitting rotational power from said power input to said power output shaft only when said clutch control means is in said second position;
    g. second means for transferring rotational power from said first fly wheel to said power input shaft;
    h. third means for transferring rotary motion of said second reel to said first shaft;
    i. fourth means for intermittently rotating said first reel to wind said ribbon thereon when said first clutch is in said first position to accelerate the rotation of said second reel, and said first shaft and first fly wheel in said first direction until substantially all of said ribbon has been removed from said first hub and said first fly wheel is rotating at a predetermined maximum velocity, with said first clutch control means thereafter being moved to said second position for rotational power from said first fly wheel to be transferred to said power output shaft; and
    j. fifth means for intermittently rotating said second reel in a direction to rewind said second ribbon on said second hub as said first fly wheel rotates for subsequent use in accelerating said first fly wheel to said predetermined maximum velocity.

2. An energy producing fly wheel assembly as defined in claim 1 in which said third means includes:
    k. a first gear that rotates concurrently with said second reel; and
    l. a second gear secured to said first shaft that is in toothed engagement with said first gear.

3. An energy producing fly wheel assembly as defined in claim 2 in which said second means includes:
    m. a third gear secured to said first fly wheel; and
    n. a fourth gear secured to said power input shaft and in toothed engagement with said third gear.

4. An energy producing fly wheel assembly as defined in claim 1 in which said fourth means is a first electric motor operatively associated with said first reel.

5. An energy producing fly wheel assembly as defined in claim 4 in which said fifth means is a second electric motor operatively associated with said second reel.

6. An energy producing fly wheel assembly as defined in claim 1 which in addition includes:
    k. a second fly wheel secured to said power output shaft that continues to rotate as said ribbon is being transferred from said first reel to said second reel;
    l. a driven shaft that extends from said second fly wheel and rotates concurrently therewith.

7. An energy producing fly sheel assembly as defined in claim 6 in combination with a vehicle that includes a pair of drive wheels, said assembly including:
    m. a second clutch that receives rotational power from said driven shaft, a drive shaft that extends from said second clutch, a movable second clutch control that can be moved between first and second positions, said second clutch transmitting rotational power from said driven shaft to said drive shaft only when said second clutch control means is in said second position;

n. a differential assembly that includes a pair of oppositely extending shafts to which said drive wheels are secured; and o. transmission means operatively associated with said drive shaft, of said second clutch and said differential assembly for delivering rotational power at a plurality of different speeds to said pair of drive wheels when said second clutch control means is in said second position.

* * * * *